United States Patent
Cointe et al.

(10) Patent No.: US 9,790,807 B2
(45) Date of Patent: Oct. 17, 2017

(54) TURBOMACHINE COMPRISING A MONITORING SYSTEM COMPRISING A MODULE FOR ENGAGING A PROTECTION FUNCTION OF THE TURBOMACHINE AND MONITORING METHOD

(71) Applicant: SNECMA, Paris (FR)

(72) Inventors: Cecile Valerie Marie Cointe, Vaux le Penil (FR); Michael Dinsart, Wichita, KS (US); Cedrik Djelassi, Marolles en Hurepoix (FR); Bruno Robert Gaully, Marolles en Hurepoix (FR)

(73) Assignee: SNECMA, Paris (FR)

( * ) Notice: Subject to any disclaimer, the term of this patent is extended or adjusted under 35 U.S.C. 154(b) by 243 days.

(21) Appl. No.: 14/396,230

(22) PCT Filed: Apr. 26, 2013

(86) PCT No.: PCT/FR2013/050934
§ 371 (c)(1),
(2) Date: Oct. 22, 2014

(87) PCT Pub. No.: WO2013/160626
PCT Pub. Date: Oct. 31, 2013

(65) Prior Publication Data
US 2015/0082802 A1 Mar. 26, 2015

(30) Foreign Application Priority Data

Apr. 27, 2012 (FR) ...................................... 12 53894

(51) Int. Cl.
*F01D 21/00* (2006.01)
*F02C 9/28* (2006.01)
(Continued)

(52) U.S. Cl.
CPC ........... *F01D 21/003* (2013.01); *F01D 21/14* (2013.01); *F02C 9/28* (2013.01); *F02C 9/46* (2013.01); *F02C 9/48* (2013.01)

(58) Field of Classification Search
CPC ...... F02C 9/28; F02C 9/46; F02C 9/48; F01D 21/003; F01D 21/14
(Continued)

(56) References Cited

U.S. PATENT DOCUMENTS

| 2,971,338 | A | * | 2/1961 | Bodemuller | ............... | F02C 9/32 60/39.281 |
| 3,520,133 | A | * | 7/1970 | Loft | .......................... | F02C 7/26 60/39.281 |

(Continued)

FOREIGN PATENT DOCUMENTS

| EP | 0 471 623 | 2/1992 |
| FR | 2 406 078 | 5/1979 |

(Continued)

OTHER PUBLICATIONS

International Search Report dated Jun. 20, 2013 in PCT/FR13/050934 Filed Apr. 26, 2013.

*Primary Examiner* — Peter Helvey
(74) *Attorney, Agent, or Firm* — Oblon, McClelland, Maier & Neustadt, L.L.P.

(57) ABSTRACT

An aircraft turbine engine including at least one spool rotating at speed N1 and a monitoring system including: a regulating module including at least one regulation measurement channel to obtain a measurement of the speed N1 and a mechanism to compare the obtained speed measurement with a thrust setpoint to provide a thrust status; and a module for engaging a protection function of UHT or ATTCS type of the turbine engine. The turbine engine further includes a system for protection against overspeed to prevent ejection of high-energy debris outside the turbine
(Continued)

engine, the protection system including at least one overspeed measurement channel to obtain an overspeed of the rotating spool of the turbine engine. The engagement module compares at least one overspeed obtained with at least one reference speed defined according to the protection function to be engaged, to engage the protection function according to results of the comparison.

8 Claims, 5 Drawing Sheets

(51) Int. Cl.
*F02C 9/46* (2006.01)
*F02C 9/48* (2006.01)
*F01D 21/14* (2006.01)

(58) Field of Classification Search
USPC .............................................. 60/779, 39.091
See application file for complete search history.

(56) References Cited

U.S. PATENT DOCUMENTS

| | | | | |
|---|---|---|---|---|
| 3,639,076 A * | 2/1972 | Rowen | ............... | B63H 3/10 416/30 |
| 3,662,545 A * | 5/1972 | Davis | ............... | F02C 9/32 60/39.281 |
| 3,667,218 A * | 6/1972 | Davis | ............... | F02C 9/28 60/39.281 |
| 3,672,163 A * | 6/1972 | White | ............... | F02C 7/26 60/39.281 |
| 3,902,315 A * | 9/1975 | Martin | ............... | F02C 7/26 60/39.091 |
| 3,987,620 A | 10/1976 | Giordano et al. | | |
| 4,032,757 A * | 6/1977 | Eccles | ............... | B64D 31/06 318/564 |
| 4,196,472 A * | 4/1980 | Ludwig | ............... | F04D 27/001 340/966 |
| 4,201,045 A * | 5/1980 | Vani | ............... | F02C 9/28 60/39.091 |
| 4,227,862 A * | 10/1980 | Andrew | ............... | F04C 28/06 417/12 |
| 4,305,364 A * | 12/1981 | Stuckas | ............... | F02D 41/1406 123/676 |
| 4,313,167 A * | 1/1982 | Brown | ............... | F02C 9/28 60/223 |
| 4,314,445 A * | 2/1982 | Lewis | ............... | F02C 9/28 60/204 |
| 4,350,008 A * | 9/1982 | Zickwolf, Jr. | ............... | F02C 7/26 60/39.281 |
| 4,397,148 A * | 8/1983 | Stockton | ............... | F02C 9/46 60/223 |
| 4,408,585 A * | 10/1983 | Stuckas | ............... | F02D 41/1406 123/676 |
| 4,455,820 A * | 6/1984 | Buckley, Jr. | ............... | F02C 9/28 60/39.281 |
| 4,627,234 A * | 12/1986 | Schuh | ............... | F02C 3/085 60/39.281 |
| 4,712,372 A * | 12/1987 | Dickey | ............... | F01D 21/02 324/160 |
| 4,716,531 A * | 12/1987 | Saunders | ............... | G05B 9/03 60/39.091 |
| 4,910,956 A * | 3/1990 | Legore | ............... | F02C 9/46 60/39.281 |
| 4,928,484 A * | 5/1990 | Peczkowski | ............... | F02C 9/28 60/240 |
| 5,157,918 A | 10/1992 | Maulat | | |
| 5,272,637 A * | 12/1993 | Urushidani | ............... | F02C 9/28 60/243 |
| 6,353,790 B1 * | 3/2002 | Tsuzuki | ............... | F02C 9/263 60/204 |
| 6,960,900 B2 * | 11/2005 | Fogarty | ............... | H02P 9/08 290/40 C |
| 7,549,292 B2 * | 6/2009 | Peck | ............... | F02C 9/18 60/773 |
| 8,674,525 B2 * | 3/2014 | Van Den Bossche | .. | F01K 3/247 290/1 A |
| 2007/0055435 A1 | 3/2007 | Muramatsu et al. | | |

FOREIGN PATENT DOCUMENTS

FR 2 960 906 12/2011
GB 2 427 711 1/2007

* cited by examiner

TURBOMACHINE COMPRISING A MONITORING SYSTEM COMPRISING A MODULE FOR ENGAGING A PROTECTION FUNCTION OF THE TURBOMACHINE AND MONITORING METHOD

The present invention relates to the field of monitoring of the speed of rotation of a turbine engine, in particular a turbojet engine for propulsion of an aircraft.

For a twin-spool turbojet engine comprising a low-pressure spool and a high-pressure spool, it is known to monitor the speed of rotation of the low-pressure spool which is known to the person skilled in the art under the designation of speed N1. The monitoring of the speed N1 makes it possible to initiate a plurality of functions for protection of the turbojet engine if an anomaly is detected.

In a known manner, with reference to FIG. 1, a turbojet engine comprises a monitoring system 1 which comprises a regulating module REG for regulation of the speed N1 intended to regulate the speed of the turbojet engine according to a setpoint provided by the pilot of the aircraft and an engagement module ENG for engagement of a protection function in order to correct an operating anomaly of the turbojet engine based on the speed N1 of the turbojet engine.

Protection Function UHT

A customary protection function is the function for protection against overthrust known to the person skilled in the art by its English abbreviation UHT for "uncontrolled high thrust". The function UHT consists of cutting off the fuel flow of the turbojet engine in the event of detection of overthrust of said turbojet engine. This function makes it possible advantageously to prevent the thrust of the aircraft from being asymmetrical between two engines of the aircraft. The protection function UHT is active only when the aircraft is at low altitude/low speed and is inactive outside this range.

In a conventional manner, with reference to FIG. 1, the monitoring system 1 comprises a regulating module REG for regulation of the speed N1 intended to regulate the speed N1 of the turbojet engine according to a setpoint $N1_{cons}$ provided by the pilot of the aircraft. Still with reference to FIG. 1, the regulating module REG of the turbojet engine monitoring system 1 comprises a first regulation measurement channel A suitable for obtaining a measurement $N1_A$ of the speed N1 and a second regulation measurement channel B suitable for obtaining a measurement $N1_B$ of the speed N1. The regulating module REG also comprises means 2A, 2B for comparison of the speed measurements $N1_A$, $N1_B$ obtained on each of the channels A, B with the thrust setpoint $N1_{cons}$ defined by the pilot of the aircraft. In FIG. 1, a logic gate ET (reference E2) makes it possible to consolidate the information deduced by the comparison means 2A, 2B in order for the regulating module REG to supply a consolidated thrust status $E_{REG}$ at the output as illustrated in FIG. 1.

For example, if the measurement $N1_A$ is equal to 4000 rpm and the measurement $N1_B$ is equal to 5000 rpm for a thrust setpoint $N1_{cons}$ equal to 2000 rpm, the comparison means 2A, 2B of the regulating module REG deduce that the turbojet engine is in "overthrust" on each of the regulation channels A, B. The logic gate ET (reference E2) then deduces from this that the thrust status $E_{REG}$ is equal to "OVERTHRUST".

As illustrated in FIG. 1, the monitoring system 1 also comprises a module ENG for engagement of a protection function in order to correct an operating anomaly of the turbojet engine based on the speed N1 of the turbojet engine.

The module ENG for engagement of the function UHT comprises comparison means 3A, 3B which are suitable for comparing the speed measurements $N1_A$, $N1_B$ obtained by the regulation measurement channels A, B of the regulating module REG with a safety setpoint $N1_{SEC}$ in order to engage the protection function UHT. In FIG. 1, a logic gate ET (reference E3) makes it possible to consolidate the information deduced by the comparison means 3A, 3B in order for the engagement module ENG to supply a consolidated activity status $E_{ENG}$ at the output as illustrated in FIG. 1. In other words, the module ENG for engagement of the function UHT is based on the same speed measurements $N1_A$, $N1_B$ obtained by the regulation measurement channels A, B of the regulating module REG in order to supply a consolidated activity status $E_{ENG}$ of the protection function UHT.

Thus, if the measurement $N1_A$ is equal to 4000 rpm and the measurement $N1_B$ is equal to 5000 rpm for a safety setpoint of $N1_{SEC}$ equal to 3000 rpm, the module ENG for engagement of the function UHT supplies an activity status $E_{ENG}$ at the output equal to "UHT ACTIVE", as the function UHT must be engaged.

Protection Function ATTCS

Another customary protection function is the function for protection against a loss of thrust known to the person skilled in the art by its English abbreviation ATTCS for "automatic take-off thrust control system". The function ATTCS consists of automatically increasing the thrust of a first engine of the aircraft when a loss of thrust or insufficient acceleration—leading to a loss of thrust—are detected on a second engine of the aircraft, in critical flight phases, for example during takeoff. In order to allow the implementation of the function ATTCS for an aircraft comprising two turbojet engines, a communication link of the ARINC type is provided between the first engine and the second engine in order to enable a dialogue. During this dialogue between engines, the speed N1 of the first engine is compared with the speed N1 of the second engine (reference $N1_{mot2}$).

For the sake of clarity, the references of FIG. 1 used for the description of the function UHT are adopted in FIG. 2 for the description of the function ATTCS when there is no incompatibility. With reference to FIG. 2, the module ENG for engagement of the function ATTCS of the turbojet engine monitoring system comprises comparison means 3A, 3B which compare the speed measurements $N1_A$, $N1_B$ obtained by the regulation measurement channels A, B of the regulating module REG with the speed $N1_{mot1}$ of the second engine in order to engage the protection function ATTCS. A logic gate ET (reference E3) makes it possible to consolidate the information deduced by the comparison means 3A, 3B in order that the engagement module ENG supplies a consolidated activity status $E_{ENG}$ at the output as illustrated in FIG. 2.

Reliability of the Monitoring System

In order to verify the reliability of the monitoring system 1, it is necessary to ensure that the protection functions of the UHT or ATTCS type are correctly engaged, even in the event of a malfunction of some components of the monitoring system 1. It is known to record events of concern which lead to a malfunction of the engagement of said functions UHT and ATTCS. The events of concern are defined in a standard known to the person skilled in the art by the designation CS-25.

Among the events of most concern, in the standard CS-25 events corresponding to the following are recorded:

loss of thrust on the first engine ($E_{REG}$=UNDERTHRUST) and non-engagement of the function ATTCS on the second engine ($E_{ENG}$=ATTCS INACTIVE); and overthrust ($E_{REG}$=OVERTHRUST) and non-engagement of the function UHT ($E_{ENG}$=UHT INACTIVE).

By way of example, the event "loss of thrust on the first engine and a non-engagement of the function ATTCS on the second engine" is shown in FIG. 2. The event of concern, referenced E1, only occurs if, cumulatively, a loss of thrust is detected on the first engine ($E_{REG}$=UNDER-THRUST) and the function ATTCS is not engaged on the second engine ($E_{ENG}$=ATTCS INACTIVE).

As an example of an event of concern, if the real value of the speed N1 is equal to 1000 rpm, if the measurement $N1_A$ is equal to 4000 rpm and the measurement $N1_B$ is absent for a thrust setpoint $N1_{cons}$ equal to 2000 rpm, the comparison means 2A, 2B of the regulating module REG deduce that the turbojet engine is in "overthrust". Because of the high erroneous value of the measurement $N1_A$ of the regulation channel A, the thrust status $E_{REG}$ is incorrect. With regard to the engagement module ENG, for a setpoint of speed of $N1_{mot2}$ equal to 2000 rpm, as the measurement $N1_A$ of the regulation channel A is erroneously high, the module ENG for engagement of the function ATTCS supplies an activity status $E_{ENG}$ equal to "ATTCS inactive" at the output although the engine is in under-thrust.

In other words, the loss of thrust ($E_{REG}$=UNDER-THRUST) only occurs if, cumulatively, the first regulation measurement channel A of the first engine supplies an erroneous item of speed information $N1$-$N1_A$ erroneous— and the second measurement channel B of the first engine supplies no information or an erroneous item of speed information $N1$-$N1_B$ absent or erroneous. Thus an incorrect thrust status $E_{REG}$ only occurs in the event of accumulation of two simultaneous malfunctions on each of the regulation measurement channels A, B. Likewise, the function ATTCS is not engaged on the second engine ($E_{ENG}$=ATTCS INACTIVE) if, cumulatively, the two regulation measurement channels A, B of the second engine receive from the first engine a speed $N1_A$ and $N1_B$ which are erroneous. Thus, if the regulation measurement channels A, B simultaneously supply erroneous data, the thrust status $E_{REG}$ and the activity status of the function $E_{ENG}$ are incorrect as the regulation measurement channels A, B supply speed values to the two modules REG, ENG of the monitoring system 1.

In practice, the appearance of the most events of concern is extremely rare because it corresponds to the simultaneous appearance of a malfunction of the regulating module REG and of the malfunction of the engagement module ENG. Furthermore, as set out above, the monitoring system 1 comprises two regulation measurement channels A, B which makes it possible to considerably increase the reliability of the monitoring system. Thus, a single isolated failure of a component does not affect the monitoring system 1 of the turbojet engine either for the engagement of the function UHT (FIG. 1) or for the engagement of the function ATTCS (FIG. 2).

Reliability of the Monitoring System in "Dispatch" Mode

In the new generations of aircraft it has been proposed to allow the aircraft to fly even when it comprises a computer having a defective regulation measurement channel. This mode of operation is known to the person skilled in the art as "impaired configuration" or "dispatch mode". In the prior art, the "dispatch" mode of operation was not allowed, which would cause inconvenience to the passengers of the aircraft who would then be detained on the ground awaiting repair although no vital component of the engine had failed, only one measurement channel being defective.

In "dispatch" mode the reliability of the monitoring system 1 is affected. By way of example, FIG. 3 shows a reliability tree for the engagement of the function ATTCS when the regulation measurement channel B fails and no longer supplies data. In a similar manner to FIG. 2, the event of concern E1 only occurs if, cumulatively, a loss of thrust is detected on the first engine ($E_{REG}$=UNDER-THRUST) and the function ATTCS is not engaged on the second engine ($E_{ENG}$=ATTCS INACTIVE). As illustrated in FIG. 3, the regulation measurement channel B having failed, the monitoring is based only on the regulation measurement channel A of the first engine.

By way of example, the loss of thrust ($E_{REG}$=UNDER-THRUST) can occur if the first regulation measurement channel A of the first engine supplies an erroneous speed $N1_A$, for example, $N1_A$ is an overestimate of the real speed N1 of the turbojet engine as presented previously. The thrust status $E_{REG}$ obtained by the regulating module REG then only depends upon an isolated malfunction. Still with reference to FIG. 3, as the value $N1_A$ supplied by the first engine is erroneous the function ATTCS is not engaged. Thus the reliability is substantially compromised in "dispatch" mode, as a single erroneous value can lead to an event of concern of the protection function ATTCS. The same applies to the function UHT (FIG. 4).

An immediate solution in order to eliminate this drawback would be to allow manual engagement of the protection functions by the pilot of the aircraft. However, this solution is not envisaged by the aircraft manufacturers who want automatic engagement of the protection functions. Another immediate solution would be to add regulation measurement channels but this solution increases the manufacturing and maintenance costs of the monitoring system which is likewise not wanted.

In order to eliminate at least some of these drawbacks, the invention relates to an aircraft turbine engine comprising at least one spool rotating at speed N1 and a monitoring system comprising:

a regulating module comprising a first regulation measurement channel suitable for obtaining a measurement of the speed N1 and a second regulation measurement channel. independent of the first measurement channel, suitable for obtaining a measurement of the speed N1, and means for comparing the obtained speed measurement with a thrust setpoint to provide a thrust status; and a module for engaging a protection function of the UHT or ATTCS type of the turbine engine, the turbine engine also comprising a system for protection against overspeed in order to prevent the ejection of high-energy debris outside said turbine engine, the protection system comprising at least one overspeed measurement channel suitable for obtaining an overspeed of the rotating spool of the turbine engine, the turbine engine comprising means capable of providing at least one measurement of overspeed on the basis of the overspeed obtained when one of the regulation measurement channels is defective, and in which the engagement module comprises at least one means for comparison of said overspeed measurement with at least one reference speed defined according to the protection function to be engaged, said engagement module being configured in order to engage said protection function according to the results of the comparison.

Thus, according to the invention, the module for engagement of a protection function of the UHT or ATTCS type does not decide the engagement of the protection function on the basis of a speed measurement obtained on a regulation channel as in the prior art but on the basis of an overspeed measurement obtained on an overspeed measurement channel of a system for protection against overspeed in order to prevent the ejection of high-energy debris outside said turbine engine. As the overspeed measurement used by the protection system is independent of that of the monitoring system, a malfunction of a measurement on a regulation channel does not affect the engagement module of the protection function. In other words, the regulation of the pressure and the engagement of the protection function are independent, which improves the reliability of the monitoring system. Moreover the engagement module functions independently of the regulating module. It can therefore engage its protection function on the basis of overspeed measurements independently of the regulating module.

The regulating module also comprises two redundant independent measurement channels in order to increase the reliability of thrust regulation, which makes it possible to envisage operation of the turbine engine in "dispatch" mode, when one of the two measurement channels is defective. According to the characteristics of the overspeed measurements and of the engagement module, a malfunction on the only regulation measurement channel cannot result in a malfunction for the engagement of the protection function. The probability of an event of concern is extremely low in "dispatch" mode.

In a first alternative embodiment, the system for protection against overspeed comprises a first overspeed detection channel suitable for obtaining an overspeed of the rotating spool of the turbine engine and a second overspeed detection channel, independent of the first overspeed detection channel, suitable for obtaining an overspeed of the rotating spool of the turbine engine, the engagement module comprising means for comparison of the two overspeeds obtained with the reference speed defined according to the protection function to be engaged. Thus regardless of the links of the overspeed measurement channels with the regulation measurement channels, in dispatch mode there is always at least one overspeed measurement available for the operation of the engagement module in dispatch mode.

In a second alternative embodiment, the system for protection against overspeed comprises a first channel for detection of overspeed suitable for obtaining an overspeed of the rotating spool of the turbine engine and a second overspeed detection channel, independent of the first overspeed detection channel, suitable for obtaining an overspeed of the rotating spool of the turbine engine and it is configured to supply a consolidated overspeed to the engagement module of the monitoring system according to the overspeeds obtained on the overspeed measurement channels. The engagement module for its part comprises means for comparison of the consolidated overspeed with the defined reference speed according to the protection function to be engaged. This variant operates like the first with respect to the "dispatch" mode. In addition, the consolidation of the overspeed transmitted to the engagement module advantageously makes it possible to avoid the transmission of an erroneous overspeed acquired on only one measurement channel. During the consolidation, the two overspeeds obtained independently are compared in order to verify their probability.

In a third alternative embodiment, the overspeed measurement channel is independent of the speed measurement channel. This variant can operate for the "dispatch" mode with only one overspeed measurement channel since in this case the failure of a regulation measurement channel does not affects the engagement module. It can also be combined with the other variants since it adds additional redundancies.

According to an aspect of the invention, for the engagement of the function UHT of the turbine engine, the comparison means of the engagement module are configured in order to compare at least one overspeed obtained with a safety speed corresponding to the maximum permitted overthrust for the turbine engine. The decision to engage the function UHT is independent of the thrust regulating module. If the overspeed exceeds the safety speed, the function UHT is engaged and the fuel supply of the turbine engine is cut off.

According to another aspect of the invention, the turbine engine comprises at least one communication link with another similar turbine engine in order to communicate to each other the value of the speed of their rotating spool, a turbine engine in which, for the engagement of the function ATTCS of said turbine engine, the comparison means of the engagement module are configured in order to compare at least one obtained overspeed of said turbine engine with the speed of said other turbine engine obtained by the communication link. The function ATTCS makes it possible to compare the speed of rotation of the rotating bodies of the two turbine engines in order to detect a possible dissymmetry of thrust. As the regulation is independent of the protection function ATTCS, the reliability of the monitoring of the turbine engine is increased.

Furthermore the invention relates to a method for monitoring an aircraft turbine engine comprising at least one spool rotating at speed N1, said method comprising:
  a step of obtaining a first measurement of the speed of the rotating spool according to a first regulation measurement channel of a monitoring system of the speed N1 and at least a second measurement of the speed of the rotating spool according to a second regulation measurement channel of said monitoring system, independent of the first measurement channel;
  a step of comparison of said measurement of speed obtained with a thrust setpoint in order to supply a thrust status;
  a step of obtaining a first overspeed of the rotating spool according to a first overspeed detection channel of a system of protection against overspeed suitable for preventing the ejection of high-energy debris outside said turbine engine, and a second overspeed of the rotating spool of the turbine engine according to a second overspeed detection channel of the same protection system, independent of the first overspeed detection channel, and
  a step of engagement of an "anti overthrust" or "anti loss of thrust" protection function of the turbine engine using the two overspeed values obtained in order to compare the overspeed measurement with at least one reference speed defined according to the protection function to be engaged.

In an alternative embodiment of the method comprising the aforementioned two first steps, the two last steps mentioned in the first variant are replaced by:
  a step of obtaining an overspeed of the rotating spool according to at least one first overspeed measurement channel, independent of the regulation measurement channels, of a system of protection against the overspeed suitable for preventing the ejection of high-energy debris outside said turbine engine, and
  a step of engagement of an "anti overthrust" or "anti loss of thrust" protection function of the turbine engine by comparison of said overspeed obtained with at least one reference speed defined according to the protection function to be engaged.

The invention will be better understood on reading the following description given solely by way of example and with reference to the accompanying drawings, in which.

Figure 1:
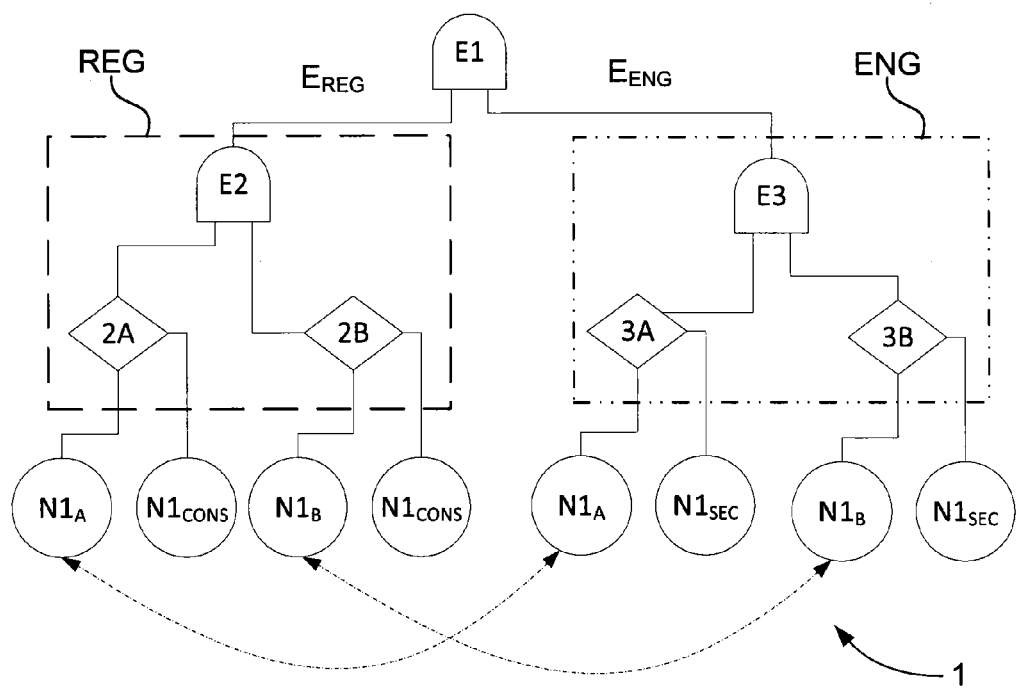
FIG. 1 is a schematic illustration of the reliability of a turbojet engine monitoring system for the engagement of a UHT function according to the prior art (already mentioned)
Figure 2:
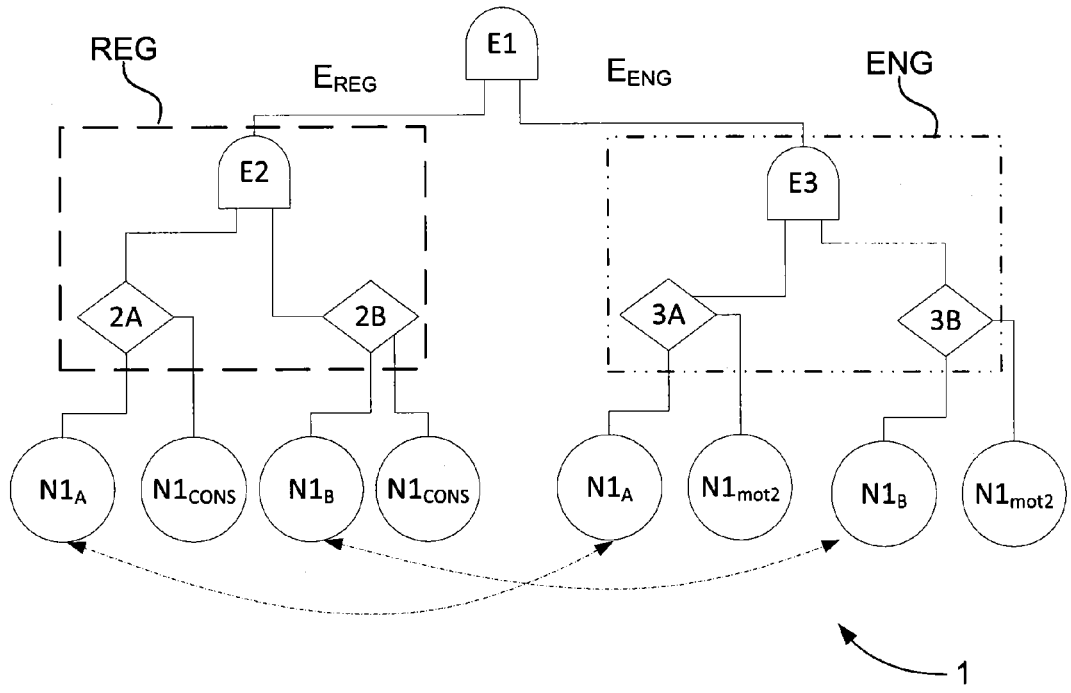
FIG. 2 is a schematic illustration of the reliability of a turbojet engine monitoring system for the engagement of a function ATTCS according to the prior art (already mentioned)
Figure 3:
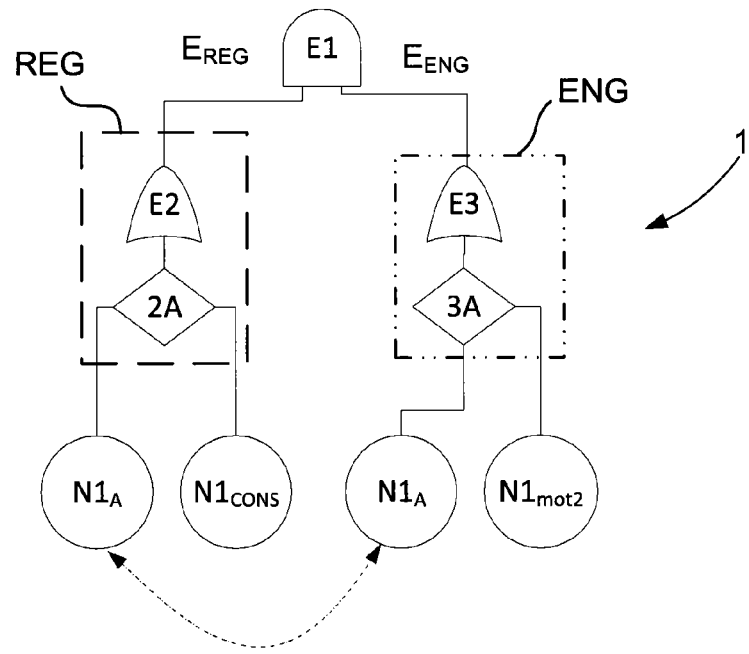
FIG. 3 is a schematic illustration of the reliability of a turbojet engine monitoring system for the engagement of a function ATTCS according to the prior art in "dispatch" mode (already mentioned)
Figure 4:
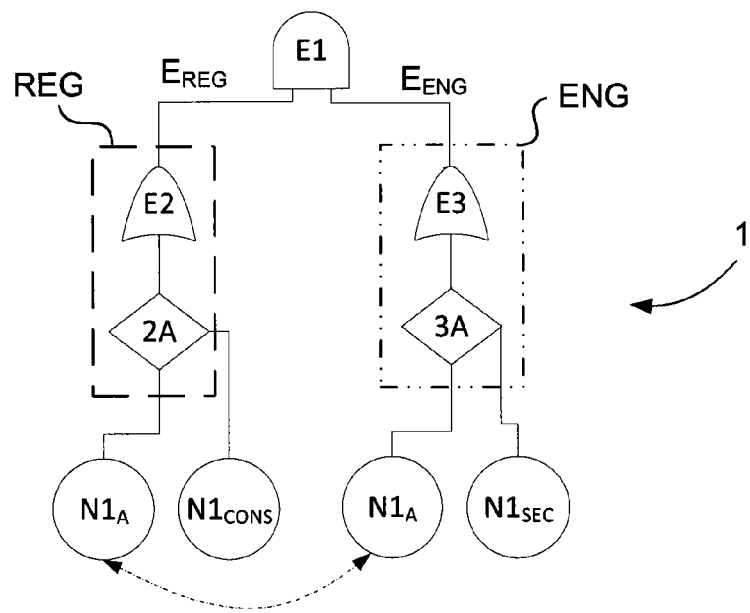
FIG. 4 is a schematic illustration of the reliability of a turbojet engine monitoring system for the engagement of a function UHT according to the prior art in "dispatch" mode (already mentioned)

It should be noted that the drawings disclose the invention in a detailed manner for implementing the invention, but said drawings can of course serve to give a better definition of the invention where appropriate.

The invention will be presented for a turbojet engine with a twin spool but it applies to any aircraft turbine engine having at least one rotating spool.

In this example, the turbojet engine with a twin spool comprises a low-pressure spool and a high-pressure spool, the speed of rotation of the low-pressure spool being known to the person skilled in the art under the designation of speed N1. As set out above, the monitoring of the speed N1 makes it possible to initiate a plurality of functions for protection of the turbojet engine if an anomaly is detected.

As illustrated in FIGS. 5 to 8, the turbojet engine comprises a monitoring system 1 which comprises a regulating module REG for regulation of the speed N1 intended to regulate the speed of the turbojet engine according to a setpoint $N1_{CONS}$ provided by the pilot of the aircraft and an engagement module ENG of a protection function in order to correct an operating anomaly of the turbojet engine based on the speed N1 of the turbojet engine.

Regulating Module REG of the Speed N1

The regulating module REG of the monitoring system 1 is a regulation module similar to the prior art which comprises a first regulation measurement channel A suitable for obtaining a measurement $N1_A$ of the speed N1 and a second regulation measurement channel B suitable for obtaining a measurement $N1_B$ of the speed N1.

The regulating module REG of the monitoring system 1 also comprises means 2A, 2B for comparison of measurements of speed $N1_A$, $N1_B$ obtained with a thrust setpoint $N1_{cons}$ in order to supply a turbojet engine thrust status $E_{REG}$ at the output. As shown in FIGS. 5 to 8, a logic gate ET (reference E2) makes it possible to consolidate the information deduced by the comparison means 2A, 2B.

By way of example, if the thrust setpoint $N1_{cons}$ is equal to 4,000 rpm and the speed measurements $N1_A$, $N1_B$ obtained are respectively equal to 2,000 rpm and 1000 rpm, the regulating module REG supplies a thrust status $E_{REG}$ indicating a loss of thrust of the turbojet engine. If only the regulation measurement channel A had indicated a loss of thrust, the thrust status $E_{REG}$ would not have indicated a loss of thrust (gate ET between the two channels A, B).

Conventionally, each regulation measurement channel A, B comprises its own acquisition means and its own speed sensors. The regulating module REG is conventionally in the form of a regulating computer, of the FADEC type, mounted on the turbojet engine.

Module for Engagement of a Protection Function

According to the invention, the module ENG for engagement of a protection function, of the UHT or ATTCS type, is independent of the regulation measurement channels A, B of the regulating module REG. In fact, according to the invention, the engagement of the protection function depends upon measurements of overspeed of the rotating spool of the turbojet engine in order to prevent the ejection of high-energy debris outside the turbojet engine and, in particular, towards the aircraft on which the turbojet engine is mounted.

Conventionally, the protection against overspeed is implemented by an electronic protection system which is independent of the monitoring system 1 enabling the regulation and the engagement of the protection functions UHT and ATTCS. A system for protection against overspeed is for example known from the patent application FR2960906 in the name of SNECMA.

In a known manner, the overspeed of the low-pressure spool of the turbojet engine is detected by a first overspeed detection channel AS and by a second overspeed detection channel BS in order to prevent the ejection of high-energy debris outside the turbojet engine. Conventionally, each overspeed detection channel AS, BS comprises its own acquisition means and its own speed sensors. The overspeed detection channels AS, BS are respectively suitable for obtaining overspeeds $N1_{As}$, $N1_{Bs}$ of the rotating spool of the turbine engine as illustrated in FIGS. 5 to 8.

According to the invention, the overspeed detection channels AS, BS of the overspeed protection system are connected to the module ENG for engagement of a protection function. Thus, the overspeeds $N1_{AS}$, $N1_{BS}$, which are values of the speed of rotation of the low-pressure spool, serve as a basis for the engagement of the protection function and are independent of the speed $N1_A$, $N1_B$ obtained for the regulating module REG, which increases the reliability of the monitoring system 1.

Conventionally, the engagement module ENG comprises comparison means 3A, 3B which are suitable for comparing the overspeeds obtained $N1_{AS}$, $N1_{BS}$ with at least one reference speed which is predetermined according to the protection function to be engaged (UHT, ATTCS) as will be set out below.

Engagement of a Protection Function UHT

Figure 5:
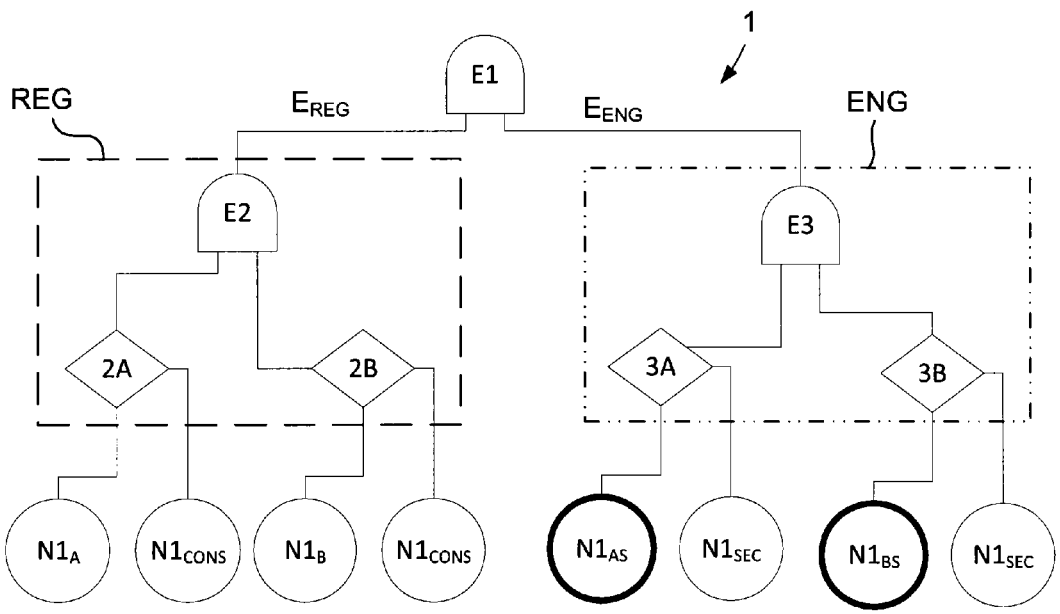
FIG. 5 is a schematic illustration of the reliability of a turbojet engine monitoring system for the engagement of a function UHT according to the invention.

For the engagement of the protection function UHT, with reference first of all to FIG. 5, the overspeeds obtained $N1_{AS}$, $N1_{BS}$ by the overspeed protection system are each compared with a safety setpoint $N1_{SEC}$ on the basis of which the protection function UHT is engaged. The safety setpoint $N1_{SEC}$ for the function UHT is similar to that used in the prior art and corresponds to the maximum speed allowed by the turbojet engine before the function UHT is actuated. When the function UHT is actuated, the fuel supply to the turbojet engine is cut off.

As illustrated in FIG. 5, when overthrust is detected by the engagement module ENG by comparison of the overspeeds $N1_{AS}$, $N1_{BS}$ with the safety setpoint $N1_{SEC}$, the UHT protection function is engaged ($E_{ENG}$=UHT ACTIVE) in order to avoid a dissymmetry of thrust of the aircraft. As the decision to engage the function UHT is independent of the thrust regulating module REG, the reliability of the monitoring system 1 is improved. Incidentally, the protection function UHT can be engaged even though the thrust status $E_{REG}$ does not indicate any overthrust.

Figure 6:
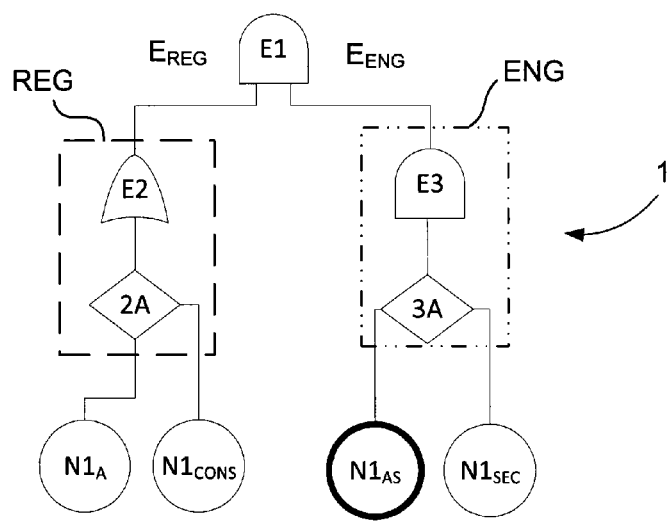
FIG. 6 is a schematic illustration of the reliability of a turbojet engine monitoring system for the engagement of a function UHT according to the invention in "dispatch" mode.

By way of example, with reference to FIG. 6 all the channels B of the monitoring system have failed in "dispatch" mode, that is to say both the regulation measurement channel B and the overspeed measurement channel BS. By virtue of the monitoring system 1 according to the invention, the regulation module REG and the engagement module ENG have independent speed information N1 in order to define the thrust and activity status of the function UHT, which improves the reliability of the monitoring system 1, and an isolated failure cannot lead to an event of concern as illustrated in FIG. 6.

Engagement of a Protection Function ATTCS

In the following embodiment a first turbojet engine and a second turbojet engine according to the invention are mounted on an aircraft. Each turbojet engine comprises at least one communication link with the other turbojet engine so as to allow a dialogue between the turbojet engines. The communication link makes it possible to communicate the value of the speed N1 of the rotating spool to the other turbojet engine in such a way that the function ATTCS can correct any dissymmetry of thrust. In this example, the two turbojet engines are connected by a communication link of the ARINC type but of course other communication means could be suitable.

Figure 7:
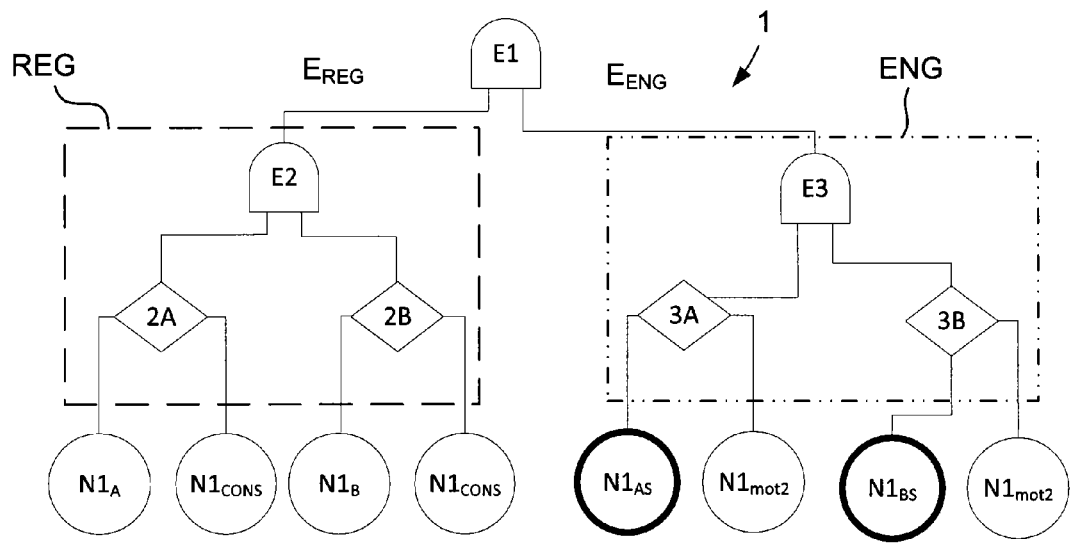
FIG. 7 is a schematic illustration of the reliability of a turbojet engine monitoring system for the engagement of a function ATTCS according to the invention.

Each turbojet engine comprises an overspeed protection system and a monitoring system 1 with its own regulating module REG and its own engagement module ENG. With reference to FIG. 7, for the engagement of the protection function ATTCS on the first turbojet engine, the obtained overspeeds $N1_{AS}$, $N1_{BS}$ of the first turbojet engine are each compared with a reference speed which corresponds to the consolidated speed $N1_{mot2}$ of the regulating module REG of the second turbojet engine. In this example, the consolidated speed $N1_{mot2}$ is obtained by processing of the speeds measured by the regulation measurement channels A, B of the regulating module REG of the second turbojet engine.

Figure 8:
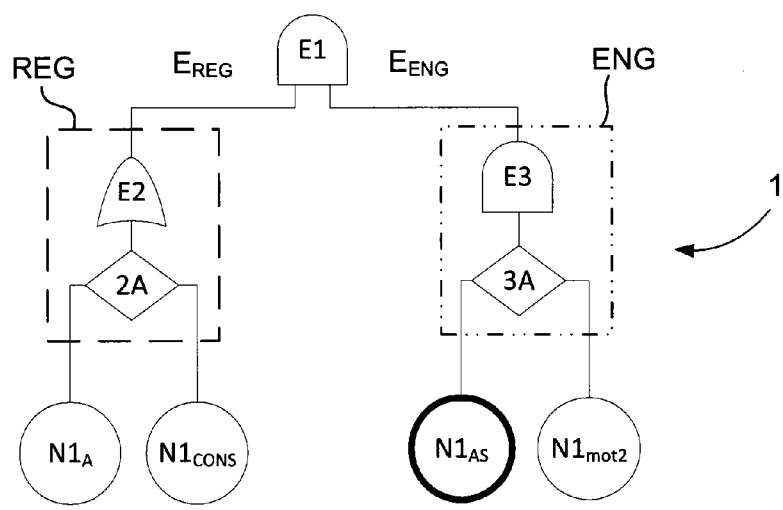
FIG. 8 is a schematic illustration of the reliability of a turbojet engine monitoring system for the engagement of a function ATTCS according to the invention in "dispatch" mode.

In other words, the first turbojet engine has the value of the speed of rotation $N1_{mot2}$ of the low-pressure spool of the second turbojet engine. As illustrated in FIG. 7, due to the means 3A, 3B for comparison of the speeds of the turbojet engines it is then possible to detect a dissymmetry of thrust between the two turbojet engines. In a similar manner to the engagement of the function UHT, by virtue of the monitoring system 1 according to the invention, the regulation module REG and the engagement module ENG have independent speed information N1 in order to define the thrust and activity status of the function ATTCS, which improves the reliability of the monitoring system 1, and an isolated failure cannot lead to an event of concern. The same applies to the engagement of the function ATTCS in "dispatch" mode as shown in FIG. 8.

Figure 9:
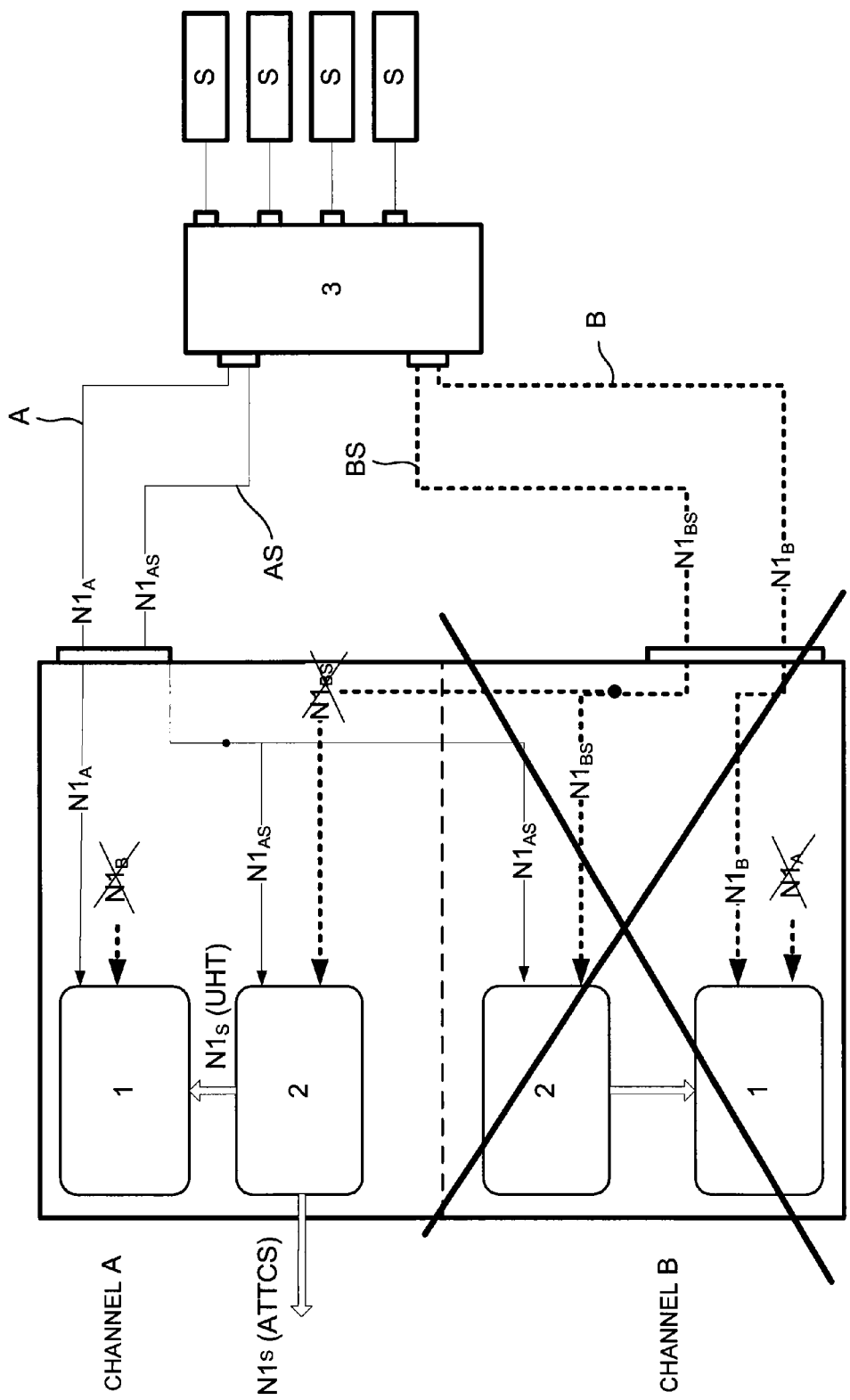
FIG. 9 is a schematic illustration of a turbojet engine monitoring system for the engagement of a function UHT or ATTCS according to the invention in "dispatch" mode.

An electronic device for monitoring the aircraft is shown schematically in FIG. 9. This electronic device is in the form of a computer, for example of the FADEC type, and comprises a monitoring system 1 and a protection system 2. For the sake of clarity, the channels A of the monitoring system 1 are shown in the upper part of the computer whilst the channels B of the monitoring system 1 are shown in the lower part of the computer.

The computer receives at the input measurements of speed $N1_A$, $N1_B$ by the regulation measurement channels A, B and measurements of overspeeds $N1_{AS}$, $N1_{BS}$ by the overspeed measurement channels AS, BS as illustrated in FIG. 9. These measurements of speed and of overspeed are carried out by measurement sensors S by means of an acquisition system 3, for example an FPGA device ("field-programmable gate array"). The measurement sensors S and the acquisition system 3 are configured in such a way that the measurements of speed $N1_A$, $N1_B$ and of overspeed $N1_{AS}$, $N1_{BS}$ are carried out independently.

The computer of FIG. 9 is shown in "dispatch" mode, all of the measurement channels B having failed. The failure is represented visually by a cross which strikes through the lower part of the computer. Because of the failure, the monitoring system 1 receives for its regulating module REG only a single measurement of speed $N1_A$, the measurement of speed $N1_B$ being absent. For its engagement module ENG, the monitoring system 1 only receives a single measurement of overspeed $N1_S$ from the protection system 2, which in this case is equal to the measurement of overspeed $N1_{AS}$ measured on the channel A of the protection system 2, the measurement of speed $N1_{BS}$ being absent due to the failure Still with reference to FIG. 9, the measurements of speed $N1_A$ and of overspeed $N1_{As}$ are received by the monitoring system 1. As presented above, the regulating module REG of the monitoring system 1 compares the measurement of speed $N1_A$ with a setpoint speed $N1_{CONS}$ not shown in FIG. 9. The module ENG for engagement of the monitoring system 1 compares the overspeed $N1_S$—supplied by the protection system 2—with a safety setpoint $N1_{SEC}$ for the engagement of the function UHT not shown in FIG. 9. With regard to the function ATTCS, the overspeed $N1_S$ supplied by the protection system 2 is compared with the speed of the rotating spool of another turbine engine. In a reciprocal manner, with reference to FIG. 9, the protection system 2 transmits the value of overspeed $N1_S$ to the second turbojet engine by the communication link in such a way that the second turbojet engine can likewise implement the function ATTCS.

By virtue of the invention, the reliability of the monitoring system is increased in all circumstances, in particular in "dispatch" mode, which provides greater safety of the turbojet engine and a better availability of the aircraft on which the turbojet engine is mounted.

The monitoring system 1 and the protection system 2 are preferably electronic systems which are preferably independent but of course they could be combined in the same computer. In a similar manner, the engagement and regulating modules are likewise electronic modules.

The invention claimed is:

1. An aircraft turbine engine comprising:
   at least one spool rotating at speed N1; and
   a monitoring system comprising:
      a regulating module comprising a first regulation measurement channel configured to obtain a measurement of the speed N1 and a second regulation measurement channel, independent of the first measurement channel, configured to obtain a measurement of the speed N1, and means for comparing the obtained speed measurements with a thrust setpoint to provide a thrust status; and
an engagement module for engaging an anti-overthrust or anti-loss of thrust protection function of the turbine engine;
a system for protection against overspeed to prevent ejection of high-energy debris outside said turbine engine, the protection system comprising at least one overspeed measurement channel configured to obtain an overspeed of the rotating spool of the turbine engine; and
means for providing at least one measurement of overspeed on the basis of the overspeed obtained when one of the regulation measurement channels is defective,
wherein the engagement module comprises at least one means for comparison of said overspeed measurement with at least one reference speed defined according to the protection function to be engaged, said engagement module configured to engage said protection function according to results of the comparison.

2. The turbine engine according to claim 1, wherein the system for protection against the overspeed comprises a first overspeed detection channel configured to obtain an overspeed of the rotating spool of the turbine engine and a second overspeed detection channel, independent of the first overspeed detection channel, configured to obtain an overspeed of the rotating spool of the turbine engine, the engagement module comprising means for comparison of the two overspeeds obtained with the reference speed defined according to the protection function to be engaged.

3. The turbine engine according to claim 1, wherein the system for protection against overspeed comprises a first overspeed detection channel configured to obtain an overspeed of the rotating spool of the turbine engine and a second overspeed detection channel, independent of the first overspeed detection channel, configured to obtain an overspeed of the rotating spool of the turbine engine, said system for protection against overspeed being configured to supply a consolidated overspeed to the engagement module of the monitoring system according to the overspeeds obtained on the overspeed measurement channels and the engagement module comprising means for comparison of the consolidated overspeed obtained with the reference speed defined according to the protection function to be engaged.

4. The turbine engine according to claim 1, wherein the overspeed measurement channel is independent of the regulation measurement channels.

5. The turbine engine according to claim 1, wherein for the engagement of the anti-overthrust function of the turbine engine, the comparison means of the engagement module is configured to compare at least one overspeed obtained with a safety speed corresponding to a maximum permitted overthrust for the turbine engine.

6. The turbine engine according to claim 1, comprising at least one communication link with another similar turbine engine in order to communicate to each other the value of the speed of their rotating spool, a turbine engine in which for the engagement of the anti-loss of thrust function of said turbine engine, the comparison means of the engagement module are configured in order to compare at least one obtained overspeed of said turbine engine with the speed of said other turbine engine obtained by the communication link.

7. A method for monitoring an aircraft turbine engine including at least one spool rotating at speed N1, said method comprising:
obtaining a first measurement of speed of the rotating spool according to a first regulation measurement channel of a monitoring system of the speed N1 and at least a second measurement of the speed of the rotating spool according to a second regulation measurement channel of said monitoring system, independent of the first measurement channel;
comparing the measurement of speed obtained with a thrust setpoint to supply a thrust status;
obtaining a first overspeed of the rotating spool according to a first overspeed detection channel of a system for protection against overspeed configured to prevent ejection of high-energy debris outside said turbine engine, and a second overspeed of the rotating spool of the turbine engine according to a second overspeed detection channel of the same protection system, independent of the first overspeed detection channel;
engaging an anti-overthrust or anti-loss of thrust protection function of the turbine engine using the two overspeed values obtained to compare the overspeed measurement with at least one reference speed defined according to the protection function to be engaged.

8. A method for monitoring an aircraft turbine engine including at least one spool rotating at speed N1, said method comprising:
obtaining a first measurement of speed of the rotating spool according to a first regulation measurement channel of a monitoring system of the speed N1 and at least a second measurement of the speed of the rotating spool according to a second regulation measurement channel of said monitoring system, independent of the first measurement channel;
comparing the speed measurements obtained with a thrust setpoint to supply a thrust status;
obtaining an overspeed of the rotating spool according to at least a first overspeed measurement channel, independent of the regulation measurement channels, of a system of protection against overspeed configured to prevent ejection of high-energy debris outside said turbine engine; and
engaging an anti-overthrust or anti-loss of thrust protection function of the turbine engine by comparison of said overspeed obtained with at least one reference speed defined according to the protection function to be engaged.

* * * * *